United States Patent [19]
Pellerin

[11] Patent Number: 5,526,769
[45] Date of Patent: Jun. 18, 1996

[54] HAY BASKET

[75] Inventor: André Pellerin, St-Adrien-de-Ham, Canada

[73] Assignee: A. Pellerin et Fils Lteé, Quebec, Canada

[21] Appl. No.: 403,463

[22] Filed: Mar. 14, 1995

[51] Int. Cl.⁶ ................................................. A01K 1/10
[52] U.S. Cl. ........................ 119/57.92; 119/60; 414/25
[58] Field of Search ............................. 119/58, 59, 60, 119/57.92, 57.5, 57.6; 414/24.5, 25; 104/93; 105/150

[56] References Cited

U.S. PATENT DOCUMENTS

| 1,518,664 | 12/1924 | Maryott | 119/60 |
| 1,643,078 | 9/1927 | Madsen | 414/25 |
| 3,020,881 | 2/1962 | Strom | 119/60 |
| 3,626,468 | 12/1971 | Hanson | 119/60 |
| 5,353,740 | 10/1994 | Pellerin | 119/57.92 |

FOREIGN PATENT DOCUMENTS 1219501 3/1987 Canada .

154372 7/1932 Switzerland ............................. 414/25

*Primary Examiner*—Todd E. Manahan
*Attorney, Agent, or Firm*—Ware, Fressola, Van Der Sluys & Adolphson

[57] ABSTRACT

The hay basket is used for distributing hay to livestock scattered along a predetermined path along which an overhead beam extends. The basket comprises a carriage provided with wheels for connecting the basket to the overhead beam and allowing translation of the basket along the beam. A base is located under the carriage and in spaced relationship therewith. A central elongated bar connects the carriage to the base. A hay receiving portion is defined by the base and a plurality of L-shaped elongated members substantially evenly distributed around the base and spaced apart from each other for allowing livestock to eat hay therethrough. Each member has a first end connected to the base and a second end located higher than the base. A rim is provided for linking together the second end of all members. In use, hay is put inside the basket and the basket may be either moved manually, attached to a self-propelled automatic feed distributing apparatus with a drawbar, or provided with a driving mechanism. The hay basket is very suitable for loose hay or hay bale fragments.

17 Claims, 4 Drawing Sheets

HAY BASKET

FIELD OF THE INVENTION

The present invention relates to a hay basket for distributing hay to livestock scattered along a predetermined path along which an overhead beam extends.

BACKGROUND OF THE INVENTION

Known in the art, there is U.S. Pat. No. 5,353,740 of R. PELLERIN granted on 11 Oct. 1994. This patent describes a self-propelled and automatic hay distributing apparatus for feeding livestock scattered along a predetermined path along which an overhead beam extends. The apparatus lifts and carries a rolled hay bale through which a rod is inserted. Driving means are mechanically connected to wheels of a carriage for moving the apparatus along the beam.

Although the apparatus of PELLERIN is well adapted for rolled hay bales, it is not suitable for loose hay or hay bale fragments, which are often used for feeding livestock.

SUMMARY OF THE INVENTION

It is therefore an object of the present invention to provide a hay basket suitable for loose hay or hay bale fragments and that is movable along an overhead beam.

More particularly, the object of the present invention is to provide a hay basket for distributing hay to livestock scattered along a predetermined path along which an overhead beam extends, the basket comprising:

a carriage provided with wheels for connecting the basket to the overhead beam and allowing translation of the basket along the beam;

a base located under the carriage and in spaced relationship therewith;

connecting means for connecting the base to the carriage;

a plurality of substantially L-shaped elongated members distributed around the base and spaced apart from each other for allowing livestock to eat hay therethrough, each member having a first end connected to the base and a second end located higher than the base; and a rim for linking together the second end of all members.

It is also an object of the present invention to provide a hay basket for distributing hay to livestock scattered along a predetermined path along which an overhead beam extends, the basket comprising:

a carriage provided with wheels for connecting the basket to the overhead beam and allowing translation of the basket along the beam;

a base located under the carriage and in spaced relationship therewith, the base having a substantially cone-shaped upper surface;

a central elongated bar for connecting the carriage to the base;

a plurality of L-shaped elongated members substantially evenly distributed around the base and spaced apart from each other for allowing livestock to eat hay therethrough, each member having a first end connected to the base and a second end located higher than the base; and a rim for linking together the second end of all members, the rim comprising a plurality of segments, each segment being connected to the second end of a first member and to the second end of a second member adjacent the first member.

It is a further object of the present invention to provide a hay basket for distributing hay to livestock scattered along a predetermined path along which an overhead beam extends, the basket comprising:

two carriages provided with wheels for connecting the basket to the overhead beam and allowing translation of the basket along the beam;

a base located under the carriages and in spaced relationship therewith, the base having a substantially cone-shaped upper surface;

two elongated central bars, each for connecting a corresponding carriage to the base;

a plurality of L-shaped elongated members substantially evenly distributed around the base and spaced apart from each other for allowing livestock to eat hay therethrough, each member having a first end connected to the base and a second end located higher than the base; and a rim for linking together the second end of all members, the rim comprising a plurality of segments, each segment being connected to the second end of a first member and to the second end of a second member adjacent the first member.

A non restrictive description of preferred embodiments will now be given with reference to the appended drawings.

DESCRIPTION OF PREFERRED EMBODIMENTS

Figure 1:
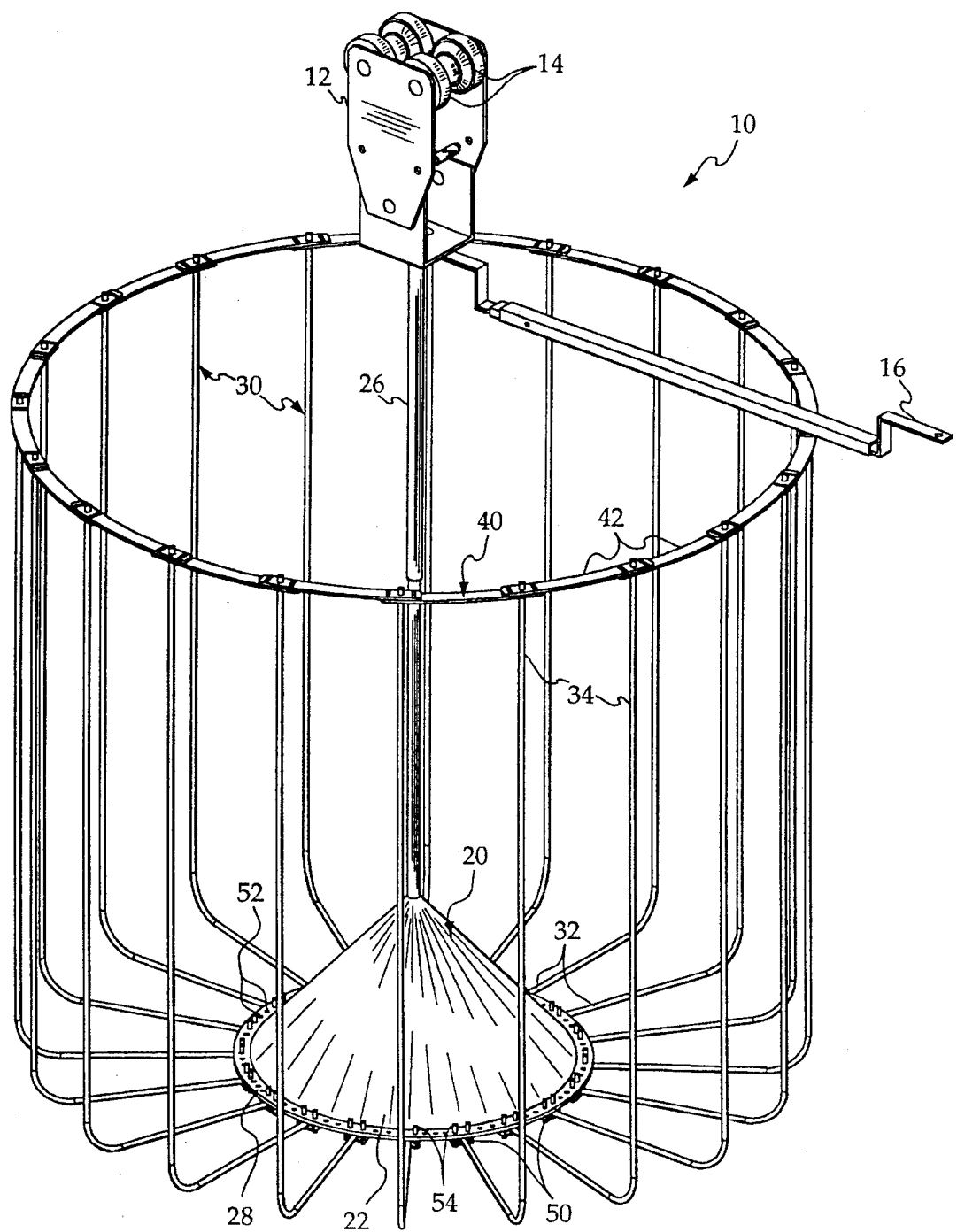
FIG. 1 is a perspective view of a first embodiment of the present invention.
Figure 2:
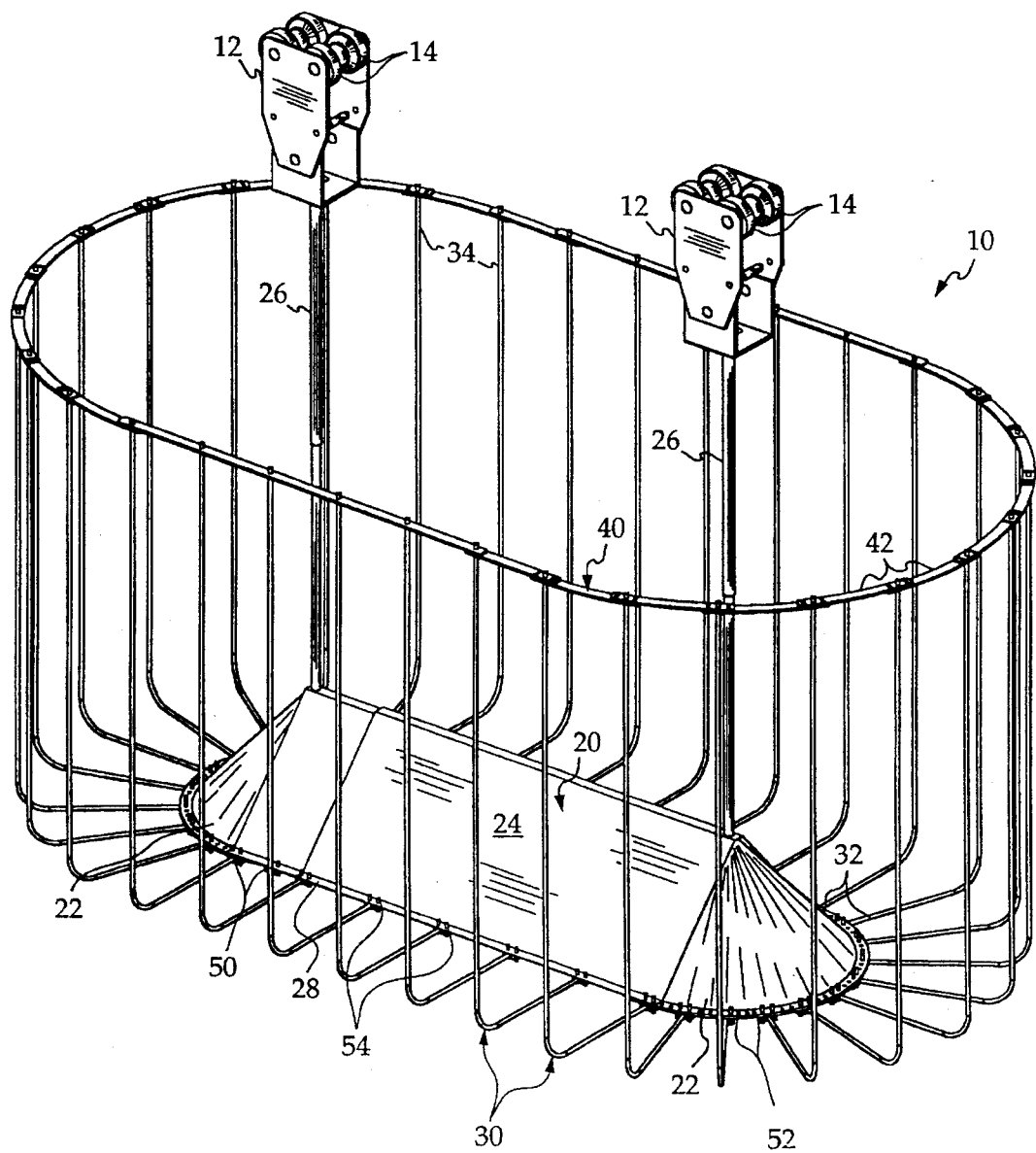
FIG. 2 is a perspective view of a second embodiment of the present invention.

The description and the drawings use the following reference numerals:

10 hay basket
12 carriage
14 wheels
16 drawbar
18 driving mechanism
20 base
22 cone-shaped upper surface
24 pyramidal-shaped upper surface
26 connecting means
28 peripheral edge
30 members
32 first end of members
34 second end of members
40 rim
42 rim segments
50 fastening means
52 holes
54 pegs
56 pivot
60 side bars In FIGS. 1 and 2, there are shown examples of a hay basket (10) according to the present invention for distributing hay to livestock scattered along a predetermined path along which an overhead beam extends. The basket (10) is preferably used with loose hay or hay bale fragments.

The basket (10) comprises a carriage (12) for suspending the basket (10) to the overhead beam. The carriage (12) is provided with wheels (14) for connecting the basket (10) to the beam and allowing translation of the basket (10) along the beam. A base (20) is located under the carriage (12) and in spaced relationship therewith. Preferably, the base (20) has a cone-shaped upper surface (22). In FIG. 2, two cone-shaped surfaces are linked by a pyramidal-shaped upper surface (24). These arrangements allow the hay near a bottom center portion of the basket (10) to fall under gravity on side bottom portions of the basket (10) so that it does not fall on the ground right under the basket (10) and out of reach of the livestock. Other upper surface shapes are possible for achieving the same results. The base (20) is connected to the carriage (12) by connecting means such as the central elongated bar (26) that is adjustable in height. Other connecting means are also possible for achieving the same results. The basket (10) in FIG. 1 is preferably rotatable with reference to the carriage (12) by means of a pivot (56).

The basket (10) comprises a plurality of substantially L-shaped elongated members (30) evenly or unevenly distributed around the base (20). The members (30) are spaced apart from each other for allowing livestock to eat hay therethrough. Each member (30) has a first end (32) connected to the base (20) and a second end (34) at a location higher than the base (20), preferably pointing upward, thereby defining the hay receiving portion of the basket (10) together with the other members (30). A rim (40) is provided for linking together the second end (34) of all members (30).

Figure 4:
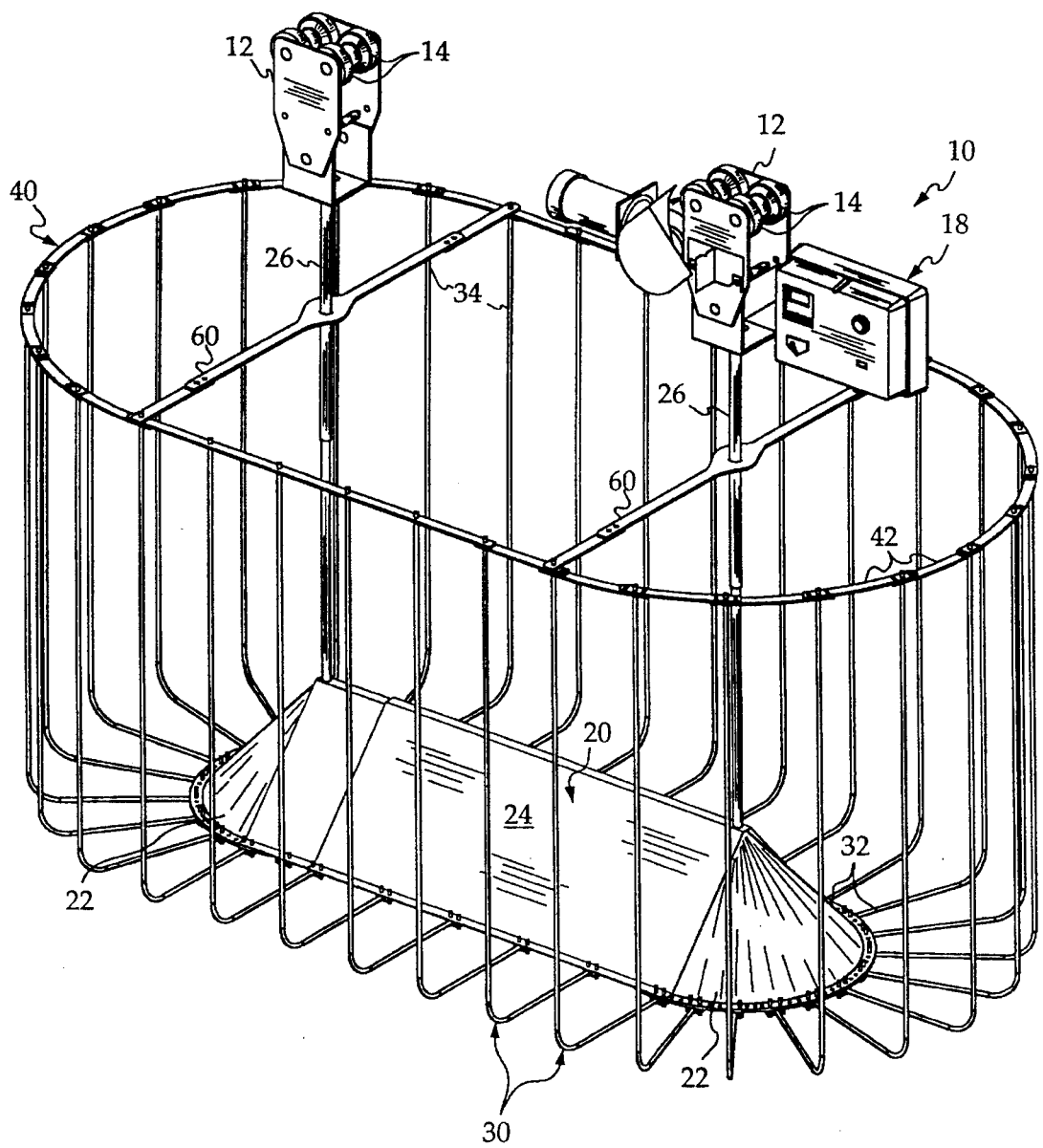
FIG. 4 is a perspective view of the hay basket in FIG. 2, further comprising a driving mechanism and side bars.

According to a preferred embodiment, the rim (40) preferably comprises a plurality of segments (42), each segment (42) being connected to the second end (34) of a first member (30) and to the second end (34) of a second member (30) adjacent the first member (30). As shown in FIG. 4, the rim (40) may be connected to the central elongated bar (26) by means of side bars (60).

According to another preferred embodiment, there is provided a plurality of fastening means (50) for removably connecting the first end (34) of the members (30) to the base (20), more particularly around its peripheral edge (28). Among many possible embodiments, there is the one where the fastening means (50) comprise holes (52) in which pegs (54) are removably connected for securing the first end (32) to the edge (28). Preferably, the holes (52) are in a number greater than necessary for allowing a substitution with a set of members (30) having a different horizontal length and provided in a different number, thereby allowing the diameter of the basket (10) to be modified and/or the spacing between the members (30) to be modified. The segments (42) have to be replaced, modified or adaptable if the spacing between the members (30) is changed.

It is also possible to have the first ends (34) welded to the base (20) or otherwise connected.

In use, hay is put inside the basket and the basket (10) may be moved either manually or attached to a self-propelled automatic feed distributing apparatus (not shown) with a drawbar (16), shown in FIG. 1.

Figure 3:
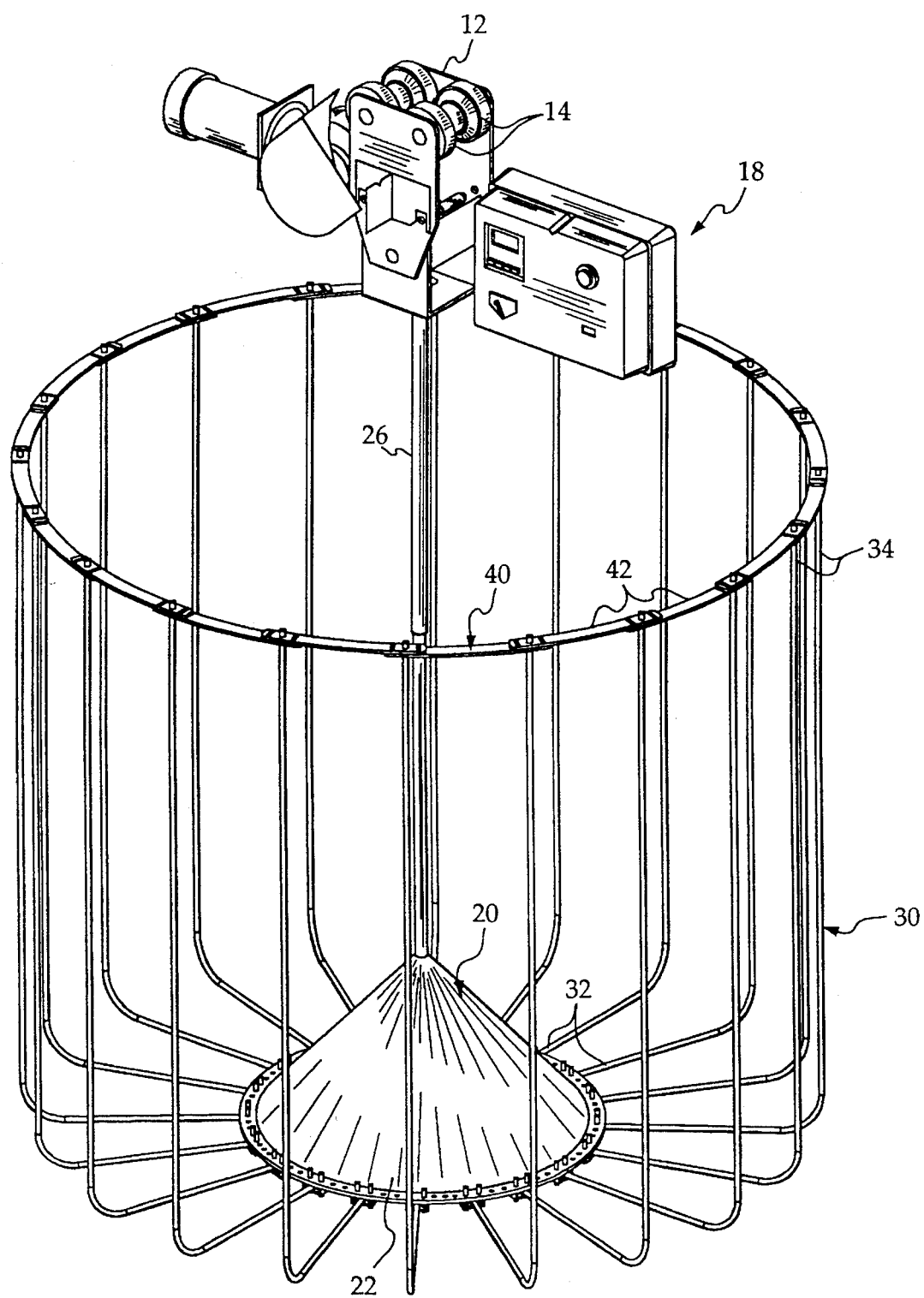
FIG. 3 is a perspective view of the hay basket in FIG. 1, further comprising a driving mechanism.

Alternatively, the hay basket (10) may comprise its own driving mechanism (18), as shown in FIGS. 3 and 4. Such mechanism (18) comprises a motor and controls for displacing the hay basket (10) for feeding the livestock. The controls may allow selecting parameters such as the travelling speed, the number of sequences and the schedule time.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

What is claimed is:

1. A hay basket for distributing hay to livestock scattered along a predetermined path along which an overhead beam extends, the basket comprising:

a carriage provided with wheels for connecting the basket to the overhead beam and allowing translation of the basket along the beam;

a base located under the carriage and in spaced relationship therewith;

connecting means for connecting the base to the carriage;

a plurality of substantially L-shaped and substantially rigid elongated members distributed around the base and spaced apart from each other for allowing livestock to eat hay therethrough, each member having a first end connected to the base and a second end located higher than the base; and a rim for linking together the second end of all members.

2. A hay basket according to claim 1, wherein connecting means comprises a central elongated bar.

3. A hay basket according to claim 1, further comprising a plurality of fastening means for removably connecting the first end of the members around a peripheral edge of the base.

4. A hay basket according to claim 3, wherein the fastening means comprise holes provided in a number such that various sets of members are adaptable thereto.

5. A hay basket according to claim 3, wherein the rim comprises a plurality of segments, each segment being respectively connected to the second end of one of the members and to the second end of one of the adjacent members thereof.

6. A hay basket according to claim 1, wherein the base has a substantially cone-shaped upper surface.

7. A hay basket according to claim 1, wherein the base has two cone-shaped upper surfaces linked together by a substantially pyramidal-shaped upper surface, thereby allowing hay near a bottom center portion of the basket to fall under gravity on sides bottom portions of the basket.

8. A hay basket according to claim 1, wherein the first end of each members is welded to the base.

9. A hay basket according to claim 1, further comprising a drawbar for attaching the carriage to an automatic self-propelled apparatus.

10. A hay basket for distributing hay to livestock scattered along a predetermined path along which an overhead beam extends, the basket comprising:

a carriage provided with wheels for connecting the basket to the overhead beam and allowing translation of the basket along the beam;

a base located under the carriage and in spaced relationship therewith, the base having a substantially cone-shaped upper surface;

a central elongated bar for connecting the carriage to the base, the central bar being rotatably connected under the carriage by means of a pivot;

a plurality of substantially L-shaped and substantially rigid elongated members, the members being substantially evenly distributed around the base and spaced apart from each other for allowing livestock to eat hay therethrough, each member having a first end connected to the base and a second end located higher than the base; and a rim for linking together the second end of all members, the rim comprising a plurality of segments, each segment being respectively connected to the second end of one of the members and to the second end of one of the adjacent members thereof.

11. A hay basket according to claim 10, further comprising a plurality of fastening means for removably connecting the first end of the members around a peripheral edge of the base.

12. A hay basket according to claim 11, wherein the fastening means comprise holes provided in a number such that various sets of members are adaptable thereto.

13. A hay basket according to claim 10, further comprising a drawbar for attaching the carriage to an automatic self-propelled apparatus.

14. A hay basket for distributing hay to livestock scattered along a predetermined path along which an overhead beam extends, the basket comprising:

two carriages provided with wheels for connecting the basket to the overhead beam and allowing translation of the basket along the beam;

a base located under the carriages and in spaced relationship therewith, the base having two cone-shaped upper surfaces linked together by a substantially pyramidal-shaped upper surface;

two elongated central bars, each for connecting a corresponding carriage to the base;

a plurality of substantially L-shaped and substantially rigid elongated members, the members being substantially evenly distributed around the base and spaced apart from each other for allowing livestock to eat hay therethrough, each member having a first end connected to the base and a second end located higher than the base; and a rim for linking together the second end of all members, the rim comprising a plurality of segments, each segment being respectively connected to the second end of one of the members and to the second end of one of the adjacent members thereof.

15. A hay basket according to claim 14, further comprising a plurality of fastening means for removably connecting the first end of the members around a peripheral edge of the base.

16. A hay basket according to claim 15, wherein the fastening means comprise holes provided in a number such that various sets of members are adaptable thereto.

17. A hay basket according to claim 14, further comprising a drawbar for attaching the carriage to an automatic self-propelled apparatus.

\* \* \* \* \*